United States Patent
Wei et al.

(10) Patent No.: US 10,911,398 B2
(45) Date of Patent: Feb. 2, 2021

(54) PACKET GENERATION METHOD BASED ON SERVER CLUSTER AND LOAD BALANCER

(71) Applicant: Huawei Technologies Co., Ltd., Shenzhen (CN)

(72) Inventors: Qimeng Wei, Shenzhen (CN); Fei Gong, Shenzhen (CN); Min Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/052,923

(22) Filed: Aug. 2, 2018

(65) Prior Publication Data

US 2018/0343228 A1     Nov. 29, 2018

Related U.S. Application Data

(63) Continuation of application No. PCT/CN2016/105230, filed on Nov. 9, 2016.

(30) Foreign Application Priority Data

Feb. 2, 2016 (CN) .......................... 2016 1 0072967
Nov. 2, 2016 (CN) .......................... 2016 1 0944661

(51) Int. Cl.
*H04L 12/00* (2006.01)
*H04L 29/12* (2006.01)
(Continued)

(52) U.S. Cl.
CPC ............ *H04L 61/103* (2013.01); *H04L 45/02* (2013.01); *H04L 45/74* (2013.01);
(Continued)

(58) Field of Classification Search
CPC ... H04L 61/103; H04L 45/02; H04L 61/2007; H04L 45/74; H04L 61/6022; H04L 67/1004
See application file for complete search history.

(56) References Cited

U.S. PATENT DOCUMENTS

| 9,141,625 B1 | 9/2015 | Thornewell et al. |
| 2002/0138628 A1* | 9/2002 | Tingley .................. H04L 61/10 709/227 |

(Continued)

FOREIGN PATENT DOCUMENTS

| CN | 101296238 A | 10/2008 |
| CN | 103023942 A | 4/2013 |

(Continued)

OTHER PUBLICATIONS

Qveflander, Aug. 2011, (Pushing real time data using HTML5 Web Sockets), pp. 1-76.*
(Continued)

*Primary Examiner* — Lakeram Jangbahadur
(74) *Attorney, Agent, or Firm* — Conley Rose, P.C.

(57) ABSTRACT

A packet generation method based on a server cluster and a load balancer, where the method includes receiving a client request packet, determining a destination server according to a preset load balancing policy, sending an Address Resolution Protocol (ARP) request packet according to the destination Internet Protocol (IP) address, obtaining an ARP response packet according to the ARP request packet, the initial Media Access Control (MAC) address is different from an actual MAC address of the destination server, and updating the destination IP address according to the initial MAC address to obtain an updated client request packet, where the updated client request packet includes the source IP address and an updated destination IP address. In this way, in a process of transmitting a packet, a source IP (Continued)

address of a client is detected on a network layer without changing a source IP address in a request packet.

19 Claims, 7 Drawing Sheets

(51) Int. Cl.
*H04L 29/08* (2006.01)
*H04L 12/751* (2013.01)
*H04L 12/741* (2013.01)

(52) U.S. Cl.
CPC ...... *H04L 61/2007* (2013.01); *H04L 61/6022* (2013.01); *H04L 67/1004* (2013.01)

(56) References Cited

U.S. PATENT DOCUMENTS

| | | | | |
|---|---|---|---|---|
| 2008/0285553 | A1* | 11/2008 | Abdulla | H04L 29/12443 370/389 |
| 2011/0138058 | A1* | 6/2011 | Ishida | H04L 63/0227 709/227 |
| 2011/0268117 | A1 | 11/2011 | Davis | |

FOREIGN PATENT DOCUMENTS

| | | |
|---|---|---|
| CN | 103384255 A | 11/2013 |
| CN | 105282043 A | 1/2016 |
| EP | 1753180 A1 | 2/2007 |
| WO | 2011143652 A2 | 11/2011 |

OTHER PUBLICATIONS

Machine Translation and Abstract of Chinese Publication No. CN101296238, Oct. 29, 2008, 26 pages.
Machine Translation and Abstract of Chinese Publication No. CN103023942, Apr. 3, 2013, 19 pages.
Machine Translation and Abstract of Chinese Publication No. CN103384255, Nov. 6, 2013, 15 pages.
Foreign Communication From A Counterpart Application, PCT Application No. PCT/CN2016/105230, English Translation of International Search Report dated Jan. 25, 2017, 2 pages.
Foreign Communication From A Counterpart Application, PCT Application No. PCT/CN2016/105230, English Translation of Written Opinion dated Jan. 25, 2017, 3 pages.
Qveflander, N., "Pushing real time data using HTML5 Web Sockets," XP055017894, Department of Computing Science, Aug. 17, 2011, pp. 1-76.
Red Hat Inc, "Red Hat Enterprise Linux 4 Cluster Suite Overview," XP002622785, Internet Citation, Apr. 24, 2009, 68 pages.
Foreign Communication From A Counterpart Application, European Application No. 16889098.6, Extended European Search Report dated Dec. 12, 2018, 13 pages.

* cited by examiner

PACKET GENERATION METHOD BASED ON SERVER CLUSTER AND LOAD BALANCER

CROSS-REFERENCE TO RELATED APPLICATIONS

This application is a continuation of International Patent Application No. PCT/CN2016/105230 filed on Nov. 9, 2016, which claims priority to Chinese Patent Application No. 201610944661.9 filed on Nov. 2, 2016, and Chinese Patent Application 201610072967.X filed on Feb. 2, 2016. The disclosures of the aforementioned applications are hereby incorporated by reference in their entireties.

TECHNICAL FIELD

The present disclosure is based on load balancing technologies, and relates to a packet generation method based on a server cluster and a load balancer used for a server cluster.

BACKGROUND

Load balance (LB) means apportioning a task to multiple operating units, such as a Web server, a file transfer protocol (FTP) server, an enterprise-critical application server, and another critical task server, for execution such that a work task is completed together.

Clustering refers to combining multiple servers together to improve performance of the servers.

A virtual local area network (VLAN) is a group of logical devices and users. The devices and users are not limited by physical locations. The devices and users may be organized according to factors such as a function, a department, and an application and may perform communication with each other as if the devices and users are in a same network segment. Therefore, the devices and users are referred to as a VLAN. A VLAN mainly works on the second layer and the third layer of an open systems interconnection (OSI) reference model. A VLAN is a broadcast domain, and communication between VLANs is completed using a router on the third layer.

For a LINUX virtual server (VS) (LVS), in an architecture of the VS as shown in FIG. 1, a group of servers are connected to each other using a high-speed local area network (LAN) or a geographically distributed wide area network (WAN), and there is one load balancer at a front end of the servers. The load balancer may seamlessly perform balancing by distributing network requests to real servers such that a structure of a server cluster is transparent to a client. The client may access a network service provided by a cluster system just like accessing a high-performance and high-availability server. A client program is not affected by the server cluster and does not need any modification. Scalability of the system is achieved by transparently adding and deleting one node in the server cluster, and high availability is achieved by detecting a fault of a node or a service process and correctly resetting the system.

Generally, an LVS cluster is of a three-layer structure, and its main components includes the following.

A. A load balancer, which is an external front-end machine of the whole cluster and is responsible for sending requests of clients to a group of servers for execution, where, however, the clients consider that services are from one Internet Protocol (IP) address;

B. A server pool, which is a group of servers that actually execute the request of the clients and execute services such as WEB, MAIL, FTP, and domain name system (DNS); and C. Shared storage, which provides a shared storage area for the server pool such that the server pool easily has same content and provides a same service.

The LVS cluster uses IP load balancing technologies and content-based request distribution technologies. The load balancer has desirable throughput, and evenly transfers requests to different servers for execution. Moreover, the load balancer automatically blocks faults of the servers in order to construct a group of servers into a high-performance and high-availability VS.

In existing IP load balancing technologies, a group of servers is constructed into a high-performance and high-availability VS mainly by means of network address translation (NAT). The technologies are referred to as a VS via NAT (VS/NAT) technology, a VS via IP tunneling (VS/TUN) technology, and a VS via direct routing (DR) (VS/DR) technology. The technologies may greatly improve scalability of a system. The VS/NAT, VS/TUN, and VS/DR technologies are three IP load balancing technologies that are implemented in the LVS cluster.

In a four-layer load balancer, if a back-end service host needs to fully transparently perceive a client IP address (an IP address transmitted in a network is the client IP address), at present, common technologies of the Internet are LVS DR and LVS NAT modes. However, in a cross-VLAN cluster deployment architecture. Because in a DR mode, the load balancer and the back-end host need to be in a same VLAN, but currently, a large-scale cloud deployment is usually cross-VLAN, a conventional DR mode cannot be applied to a large-scale cross-VLAN cluster deployment.

SUMMARY

An embodiment of the present disclosure provides a packet generation method based on a server cluster, where the method includes obtaining a client request packet, where the client request packet includes a source IP address and a destination IP address, determining a destination server according to a preset load balancing policy, obtaining an Address Resolution Protocol (ARP) request packet according to the destination IP address, obtaining an ARP response packet according to the ARP request packet, where the ARP response packet includes an initial Media Access Control (MAC) address of the destination server, and the initial MAC address is different from an actual MAC address of the destination server, and updating the destination IP address according to the initial MAC address to obtain an updated client request packet, where the updated client request packet includes the source IP address and an updated destination IP address. According to the packet generation method in the embodiment of the present disclosure, a data packet may be effectively sent in a large-scale cross-VLAN deployment such that a source IP address of a client may be known on a physical layer, a network layer, and the like.

In a possible implementation manner of the present disclosure, the obtaining an ARP response packet includes obtaining the initial MAC address according to an IP address of the destination server, and obtaining the ARP response packet according to the initial MAC address. By constructing an initial MAC address, a packet may be correctly sent to a network such that normal processing of a service may be ensured without changing a source IP address of the packet. A source IP address may be obtained on a network layer without modifying any server configuration such that work, such as client behavior analysis and network interception, may be performed on the network layer, thereby greatly improving client experience.

In a possible implementation manner, the initial MAC address is obtained from a preset form according to the IP address of the server, where the preset form is used to store a correspondence between an IP address of a server and a MAC address. In a possible implementation manner, there is a one-to-one correspondence between an IP address and a MAC address.

In a possible implementation manner, the IP address of the destination server is translated according to a preset algorithm to obtain the initial MAC address. In such a manner, a MAC address may be constructed in real time without previously storing a flow table such that a response to an ARP request is made in time while saving storage space. When multiple requests are processed, the requests may be effectively processed in time by constructing a MAC address, and normal implementation of a service is ensured.

In a possible implementation manner, the updated destination IP address is the same as the IP address of the server. In this way, a packet may be correctly sent to a server.

An embodiment of the present disclosure discloses a load balancer for a server cluster, where the load balancer includes a DR module configured to obtain a client request packet, where the client request packet includes a source IP address and a destination IP address, where the DR module is further configured to determine a destination server according to a preset load balancing policy, the DR module is further configured to send an ARP request packet according to the destination IP address, and the DR module is further configured to obtain an ARP response packet according to the ARP request packet, where the ARP response packet includes an initial MAC address of the destination server, and the initial MAC address is different from an actual MAC address of the destination server, and a packet address translation module configured to update the destination IP address according to the initial MAC address to obtain an updated client request packet, where the updated client request packet includes the source IP address and an updated destination IP address. According to the load balancer in the embodiment of the present disclosure, a data packet may be effectively sent in a large-scale cross-VLAN deployment such that a source IP address of a client may be known on a physical layer, a network layer, and the like.

In a possible implementation manner of the present disclosure, the DR module is further configured to obtain the initial MAC address according to an IP address of the destination server, and obtain the ARP response packet according to the initial MAC address. By constructing an initial MAC address, a packet may be correctly sent to a network such that normal processing of a service may be ensured without changing a source IP address of the packet. A source IP address may be obtained on a network layer without modifying any server configuration such that work, such as client behavior analysis and network interception, may be performed on the network layer, thereby greatly improving client experience.

In a possible implementation manner, the DR module is further configured to obtain the initial MAC address from a preset form according to the IP address of the destination server, where the preset form is used to store a correspondence between an IP address of a server and a MAC address, and obtain the ARP response packet according to the initial MAC address. In a possible implementation manner, there is a one-to-one correspondence between an IP address and a MAC address.

In a possible implementation manner of the present disclosure, the DR module is further configured to translate the IP address of the destination server according to a preset algorithm to obtain the initial MAC address, and obtain the ARP response packet according to the initial MAC address. In such a manner, a MAC address may be constructed in real time without previously storing a flow table such that a response to an ARP request is made in time while saving storage space. When multiple requests are processed, the requests may be effectively processed in time by constructing a MAC address, and normal implementation of a service is ensured.

In a possible implementation manner, the updated destination IP address is the same as the IP address of the destination server. In this way, a packet may be correctly sent to a server.

In a possible implementation manner, the load balancer further includes a detection module configured to detect a next-hop MAC address of the load balancer and use the next-hop MAC address as a MAC address of an updated packet. In this way, a packet may be correctly sent to a server.

An embodiment of another aspect of the present disclosure provides a load balancer, where the load balancer includes a processor and a memory, the memory stores executable code, and the processor executes the code to obtain a client request packet, where the client request packet includes a source IP address and a destination IP address, the executable code is further used to determine a destination server according to a preset load balancing policy, the executable code is further used to obtain an ARP request packet according to the destination IP address, the executable code is further used to obtain an ARP response packet according to the ARP request packet, where the ARP response packet includes an initial MAC address of the destination server, and the initial MAC address is different from an actual MAC address of the destination server, and the executable code is used to update the destination IP address according to the initial MAC address to obtain an updated client request packet, where the updated client request packet includes the source IP address and an updated destination IP address. According to the load balancer in the embodiment of the present disclosure, a data packet may be effectively sent in a large-scale cross-VLAN deployment such that a source IP address of a client may be known on a physical layer, a network layer, and the like.

In a possible implementation manner of the present disclosure, the processor executes the code to obtain the initial MAC address according to an IP address of the destination server, and obtain the ARP response packet according to the initial MAC address. By constructing an initial MAC address, a packet may be correctly sent to a network such that normal processing of a service may be ensured without changing a source IP address of the packet. A source IP address may be obtained on a network layer without modifying any server configuration such that work, such as client behavior analysis and network interception, may be performed on the network layer, thereby greatly improving client experience.

In a possible implementation manner, the processor executes the code to obtain the initial MAC address from a preset form according to the IP address of the destination server, where the preset form is used to store a correspondence between an IP address of a server and a MAC address, and obtain the ARP response packet according to the initial MAC address. In a possible implementation manner, there is a one-to-one correspondence between an IP address and a MAC address.

In a possible implementation manner of the present disclosure, the processor executes the code to translate the IP address of the destination server according to a preset algorithm to obtain the initial MAC address, and obtain the ARP response packet according to the initial MAC address. In such a manner, a MAC address may be constructed in real time without previously storing a flow table such that a response to an ARP request is made in time while saving storage space. When multiple requests are processed, the requests may be effectively processed in time by constructing a MAC address, and normal implementation of a service is ensured.

In a possible implementation manner, the updated destination IP address is the same as the IP address of the destination server. In this way, a packet may be correctly sent to a server.

In a possible implementation manner, the processor executes the code to detect a next-hop MAC address of the load balancer and use the next-hop MAC address as a MAC address of an updated packet. In this way, a packet may be correctly sent to a server.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
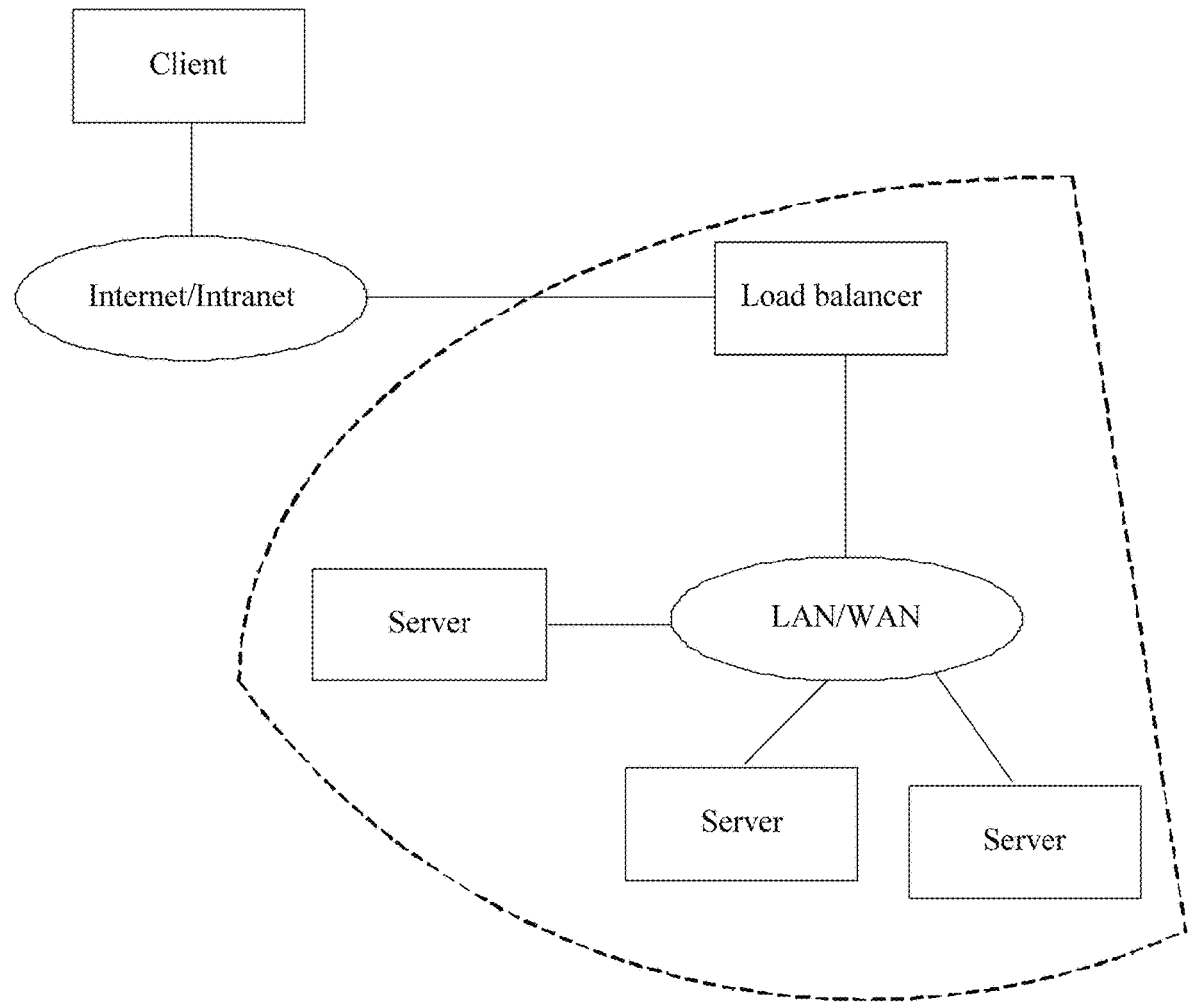
FIG. 1 is a schematic diagram of an architecture of a VS.
Figure 2:
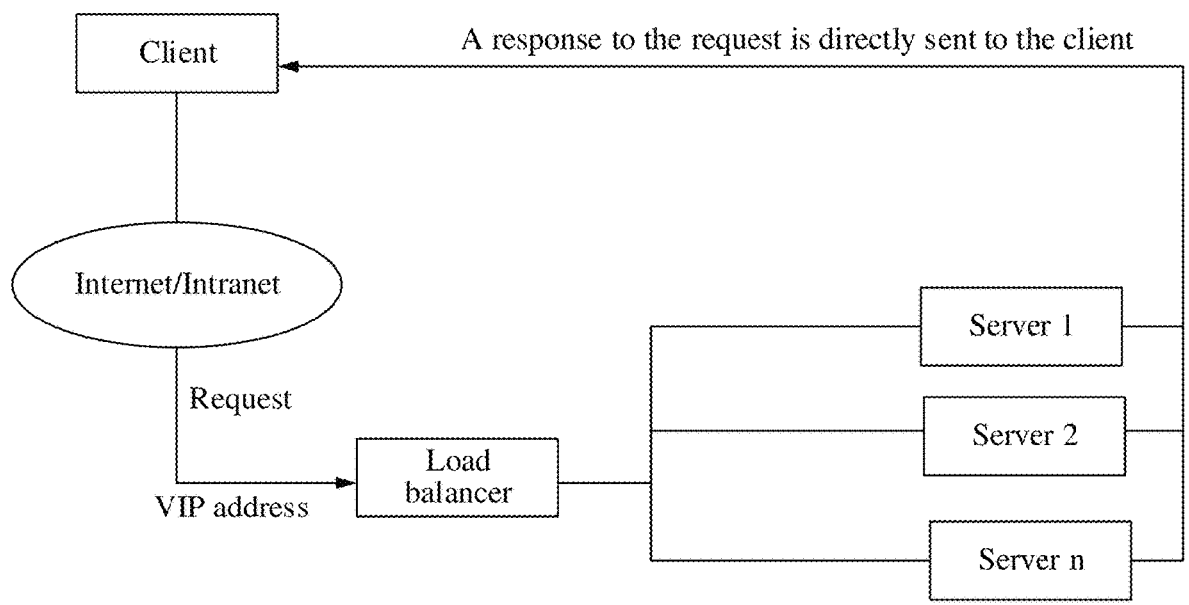
FIG. 2 is a schematic diagram of an architecture of a VS/DR technology.
Figure 3:
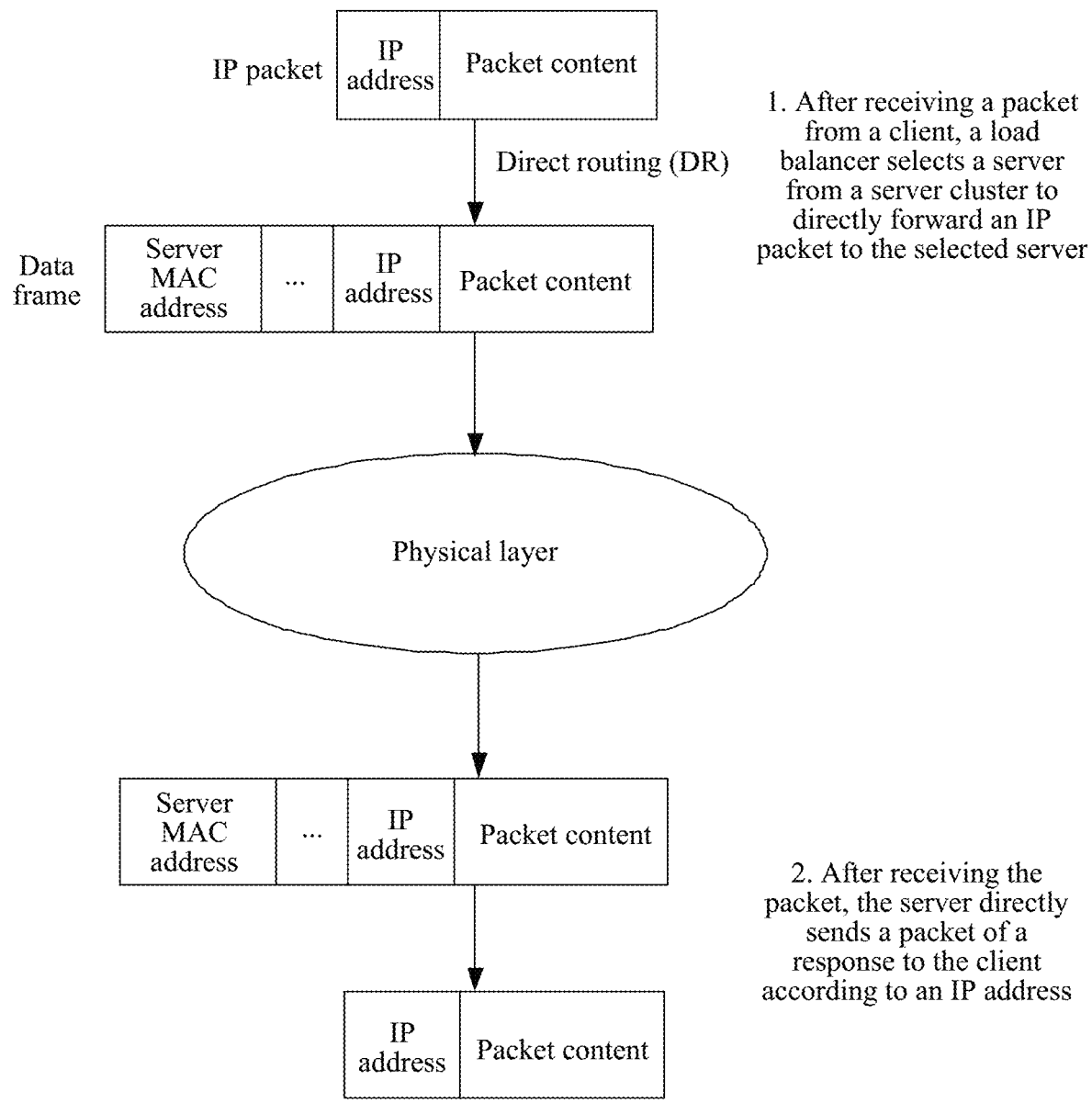
FIG. 3 is a schematic diagram of a working procedure of a VS/DR technology.

The following briefly describes a VS/DR technology with reference to FIG. 2 and FIG. 3. In the VS/DR, a feature of asymmetry in most Internet services is used. A load balancer is only responsible for balancing requests, and a server directly returns a response to a client such that throughput of a whole cluster system may be greatly increased.

An architecture of the VS/DR is shown in FIG. 2. A load balancer and a server group both need to physically have a network adapter to connect to each other using a LAN that is not segmented, such as a high-speed switch or a HUB. A virtual IP (VIP) address is shared by the load balancer and the server group. A VIP address configured by the load balancer is externally visible and is used to receive a request packet of a VS. All servers configure the VIP address on Non-ARP network devices of the servers, and the VIP address is externally invisible and is only used to process a network request whose destination address is the VIP.

A working procedure of the VS/DR is shown in FIG. 3. In the VS/DR, a packet is directly routed to a target server. In the VS/DR, the load balancer dynamically selects a server according to load of the servers, modifies a MAC address of a data frame into a MAC address of the selected server without modifying nor encapsulating an IP packet, and sends a modified data frame on a local area network of the server group. Because the MAC address of the data frame is that of the selected server, the server can certainly receive the data frame and obtain the IP packet from the data frame. When the server finds that a target address of the packet is on a local network device, the server processes the packet, and then directly returns a response packet to a client according to a routing table.

In an implementation manner of the VS/DR, according to default transmission control protocol (TCP)/IP stack processing, a target address of the request packet is a VIP, and a source address of the response packet is also certainly a VIP. Therefore, the response packet does not need any modification, and may be directly returned to the client. The client considers that a normal service is obtained, but does not know which server processes the service.

Because in a DR mode, a load balancer and a back-end host need to be in a same VLAN, but currently, a large-scale cloud deployment is usually cross-VLAN, a conventional DR mode cannot be applied to a large-scale cross-VLAN cluster deployment. However, an embodiment of the present disclosure provides a packet sending method based on a DR technology, in which a data packet may be effectively sent in a large-scale cross-VLAN deployment such that a source IP address of a client may be known on a physical layer, a network layer, and the like.

Figure 4:
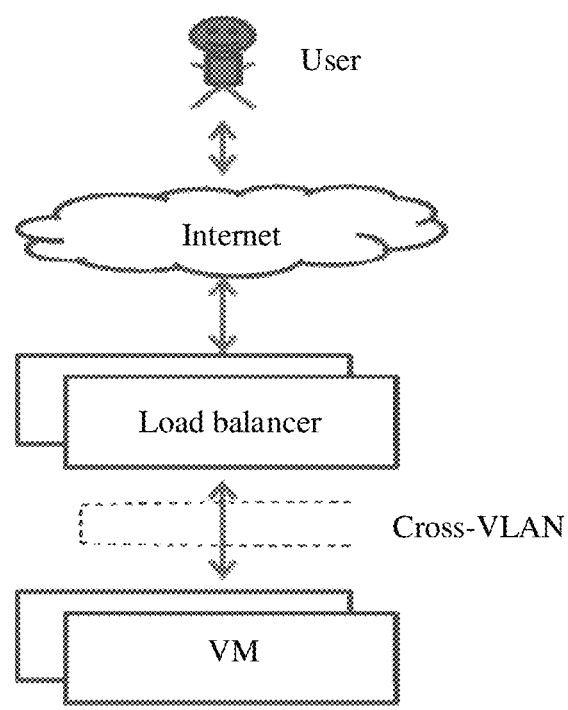
FIG. 4 is a schematic diagram of a deployment of a load balancer in a large-scale cross-VLAN cluster.

FIG. 4 is a schematic diagram of a deployment of an load balancer in a large-scale cross-VLAN cluster. As shown in FIG. 4, a client user accesses a server cluster by means of the Internet to obtain multiple types of services. This deployment may be in a form of a public cloud or a private cloud. The load balancer is an external front-end machine of the whole cluster and is responsible for sending a request from a client to a group of servers for execution. A server group runs multiple Virtual Machines (VMs), and the VMs may process various service requests.

Figure 5:
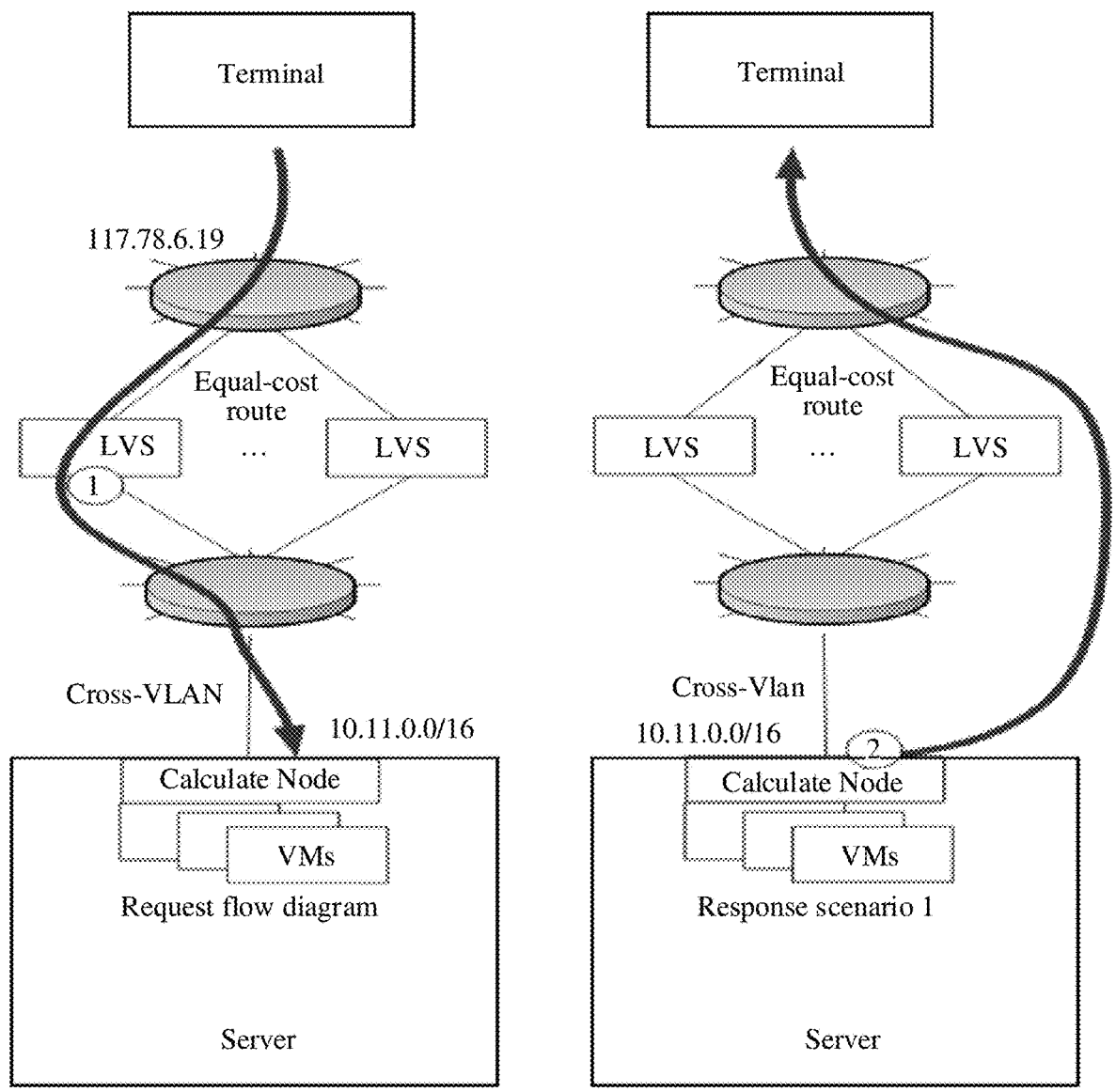
FIG. 5 is a schematic flowchart of a packet request and a packet response that are based on a server cluster according to an embodiment of the present disclosure.

FIG. 5 discloses a schematic flowchart of a packet request and a packet response that are based on a server cluster according to an embodiment of the present disclosure.

As shown in FIG. 5, for a request packet sent by a terminal, a switch sends the packet to an LVS cluster using an equal-cost route and modifies a destination IP address into an IP address of a back-end host in cooperation with flow table management such that the packet may be transmitted to a back-end server across VLANs. In such a process, a source IP address in the request packet is not changed such that a source IP address of a client may be detected on a network layer.

For a response packet that is sent for the request packet, source network address translation (SNAT) needs to be performed, a source IP of the response packet is modified into a public network IP address (that is, the destination IP address in the request packet), and an SNAT module may be deployed on a calculation node corresponding to a VM. In this way, the source IP address of the response packet received by the client is consistent with the destination IP address in the request packet, a request sent by the client obtains a correct response.

A specific implementation manner of packet generation, sending, and response based on a server cluster according to an embodiment of the present disclosure is described in detail below with reference to FIG. 6 to FIG. 8.

Figure 6:
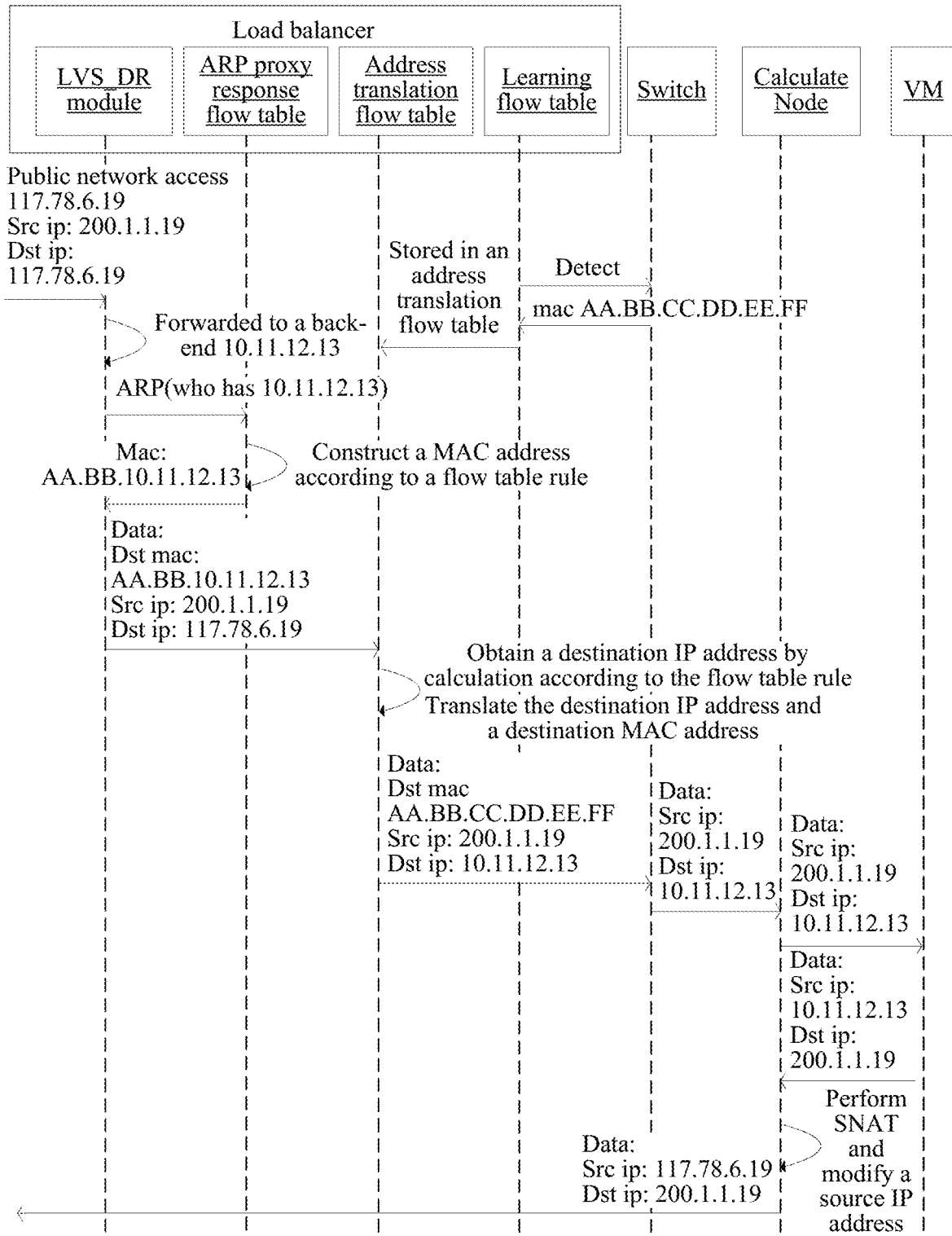
FIG. 6 is a schematic diagram of an implementation manner of packet generation, sending, and response based on a server cluster according to an embodiment of the present disclosure.

As shown in FIG. 6, an IP address of a client is 200.1.1.19, and the client may be a notebook computer, a desktop computer, a mobile phone, a tablet computer, or another network access device. If the client needs to request for a service whose public network IP address is 117.78.6.19, a source IP address (designated as Src ip) of the request packet is 200.1.1.19, and a destination IP address (designated as Dst ip) is 117.78.6.19.

In a possible implementation manner, the client may first send a request for access to a domain name, such as access to www.huawei.com, and after a DNS server completes parsing the domain name, the server sends a public network IP address corresponding to the domain name to the client.

After the request packet is forwarded using a router, a load balancer located at a forefront end of an LVS cluster receives the packet and performs a series of processing on the packet.

After receiving the request packet, the load balancer selects, according to an LB scheduling algorithm, a server from the server cluster to respond to the request. For example, for a server 1, a corresponding IP address is 10.11.12.11, for a server 2, a corresponding IP address is 10.11.12.12, and for a server 3, a corresponding IP address is 10.11.12.13, and the like. In this example, the server 3 is selected, and the corresponding IP address is 10.11.12.13.

Further, a reference may be made to various LB scheduling algorithms disclosed in other approaches for a manner of selecting a server from a server cluster according to an LB scheduling algorithm, and this embodiment of the present disclosure merely briefly describes the manner. A load scheduling policy and algorithm on a load balancer mainly include two aspects of a dynamic feedback load balancing algorithm that is implemented in a kernel. The dynamic feedback load balancing algorithm mainly adjusts a weight of the server with reference to a weighted connection scheduling algorithm in the kernel according to load information that is dynamically fed back, to further avoid load unbalance among the servers. Connection scheduling algorithms in a kernel mainly include manners such as round-robin scheduling, weighted round-robin scheduling, least-connection scheduling, weighted least-connection scheduling, locality-based least connects scheduling, locality-based least connections with replication scheduling, destination hashing scheduling, and source hashing scheduling. In the dynamic feedback load balancing algorithm, real-time load and responses of servers are considered, a proportion of requests processed by the servers is adjusted continuously to avoid a situation in which some servers still receive a lot of requests when the servers are overloaded in order to increase throughput of a whole system, and aspects, such as connection scheduling, a dynamic feedback load balancing mechanism, a comprehensive load, and weight calculation, are mainly included.

In an embodiment of the present disclosure, three flow tables are stored in a load balancer, and the load balancer may implement different functions according to the flow tables.

1. ARP proxy response flow table:

After receiving an ARP packet, the load balancer may construct a MAC address according to the ARP proxy response flow table such that a subsequent packet may be sent.

2. Address translation flow table:

The load balancer may modify a destination MAC address and a destination IP address of the packet according to the address translation flow table such that the packet may be sent across VLANs.

3. Learning flow table:

The load balancer detects a next-hop MAC address and stores the next-hop MAC address in the address translation flow table.

In an implementation manner of the present disclosure, the load balancer periodically sends an ARP broadcast to perform detection by configuring an egress gateway IP address, obtains a next-hop MAC address of the network by comparing a detected IP address with the gateway IP address, and stores the next-hop MAC address in the address translation flow table.

In an example of the present disclosure, after the load balancer determines that the server 3 responds to the request packet, an LVS DR module sends an ARP packet to inquire a corresponding MAC address. The ARP packet is not actually sent to the network, but is intercepted and processed inside the load balancer.

Figure 7:
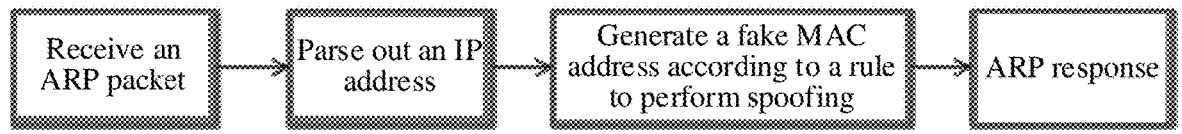
FIG. 7 is a schematic flowchart of processing of an ARP proxy response procedure according to an embodiment of the present disclosure.

The following describes a schematic flowchart of processing of an ARP proxy response procedure according to an embodiment of the present disclosure with reference to FIG. 7. As shown in FIG. 7, in an ARP proxy response flow table, an ARP packet is received first, a corresponding IP address (for example, 10.11.12.13) is parsed out from the ARP packet, and then, a fake MAC address is generated according to a preset rule to perform spoofing. It should be noted that the fake MAC address herein means that the MAC address is inconsistent with an actual physical MAC address of the server 3. Performing spoofing means making the LVS DR module send, according to a received ARP response packet, a request packet to a MAC address in the response packet. By constructing a fake MAC address, the load balancer enables the packet to be correctly sent to the network such that normal processing of a service may be ensured without changing a source IP address of a packet. A source IP address may be obtained on a network layer without modifying any server configuration such that work, such as client behavior analysis and network interception, may be performed on the network layer, thereby greatly improving client experience.

In an implementation manner of the present disclosure, a MAC address corresponding to an IP address is obtained according to a preset rule. For example, two fields are added before or after a field of an IP address.

Example 1

If an IP address is 10.11.12.13, a constructed MAC address is aa.bb.10.11.12.13.

Example 2

If an IP address is 10.11.12.13, a constructed MAC address is 10.11.12.13.aa.bb.

Example 3

If an IP address is 10.11.12.13, a constructed MAC address is 10.11.aa.12.13.bb.

In such a manner, a MAC address may be constructed in real time without previously storing a flow table such that a response to an ARP request is made in time while saving storage space. When multiple requests are processed, the requests may be effectively processed in time by constructing a MAC address, and normal implementation of a service is ensured.

In an implementation manner of the present disclosure, a MAC address corresponding to an IP address is obtained by means of table lookup, and there is a one-to-one correspondence between an IP address and a MAC address.

After receiving the ARP packet, the LVS DR module encapsulates the MAC address in the ARP packet and the request packet of the client together. In this case, a destination MAC address of the packet is a MAC address that is constructed using the ARP proxy response flow table, and the source IP address and the destination IP address are the same as those of the request packet of the client.

In an embodiment of the present disclosure, for a subsequent packet from a same request, the LVS DR module directly determines that a MAC address of the packet is the obtained MAC address and performs encapsulation according to the MAC address to obtain an encapsulated packet.

The encapsulated packet is not actually sent to the network, but is intercepted inside the load balancer.

In an implementation manner of the present disclosure, an address translation flow table is used to intercept a packet, obtain a destination MAC address of the current packet, which is aa.bb.10.11.12.13, obtain by calculation a destination IP address, which is 10.11.12.13, according to a flow table rule, and at the same time, with reference to a next-hop MAC address, aa.bb.cc.dd.ee.ff, obtained from a learning flow table, translate the destination IP address and MAC address of the current packet:

Destination IP address translation: 117.78.6.19→10.11.12.13; and

Destination MAC address translation: aa.bb.10.11.12.13→aa.bb.cc.dd.ee.ff.

In this way, the packet may be sent to a next hop in the network by means of MAC address translation, and the packet may be distributed across VLANs by means of IP address translation (10.11.12.13 is an intranet IP address and is reachable by routing).

In an implementation manner of the present disclosure, the address translation flow table may also obtain an IP address corresponding to the destination MAC address by means of table lookup, and there is a one-to-one correspondence between an IP address and a MAC address.

Figure 8:
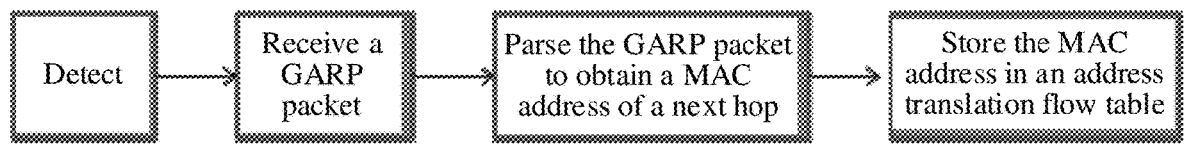
FIG. 8 is a flowchart of processing based on a learning flow table according to an embodiment of the present disclosure.

The following describes a flowchart of processing of a load balancer according to an embodiment of the present disclosure with reference to FIG. 8. As shown in FIG. 8, a MAC address of a next hop is obtained by means of the Generic Attribute Registration Protocol (GARP). A status of a network may be detected at a preset time interval or according to a form of triggering a request. Then a GARP packet is received, the MAC address of the next hop is obtained by parsing the GARP packet, and then, the MAC address of the next hop is stored in an address translation flow table.

After receiving a request packet of a client, a server generates a response packet according to the request packet. A source IP address of the response packet is an IP address of the server, and a destination address is an IP address of the client. After translation is performed using an address translation protocol, the source IP address of the response packet is translated into an IP address of a public network that is requested by the request packet for access. Then the translated response packet is directly sent to the client according to the IP address of the client.

In an implementation manner of the present disclosure, an address translation module may be deployed on a calculate node.

In an implementation manner of the present disclosure, a correspondence between a VIP and an IP address of a VM may be stored in an SNAT flow table when the LB is established.

In a process of processing the request, the destination IP has been translated into an intranet virtual IP address, 10.11.12.13. When the VM returns the packet, a source IP address is 10.11.12.13, and an IP address, initially accessed by the client, of the Internet is VIP 117.68.6.19. In this case, the source IP address (VMIP), 10.11.12.13, is translated into 117.68.6.19 according to the SNAT flow table to be returned to the client in order to ensure service connectivity.

In an example, the SNAT flow table is as follows:

| VIP | VMIP |
|---|---|
| 117.78.6.19 | 10.11.12.13 |
| 117.78.6.19 | 10.11.12.14 |
| 117.78.6.19 | 10.11.12.15 |
| ... | ... |

Figure 9:
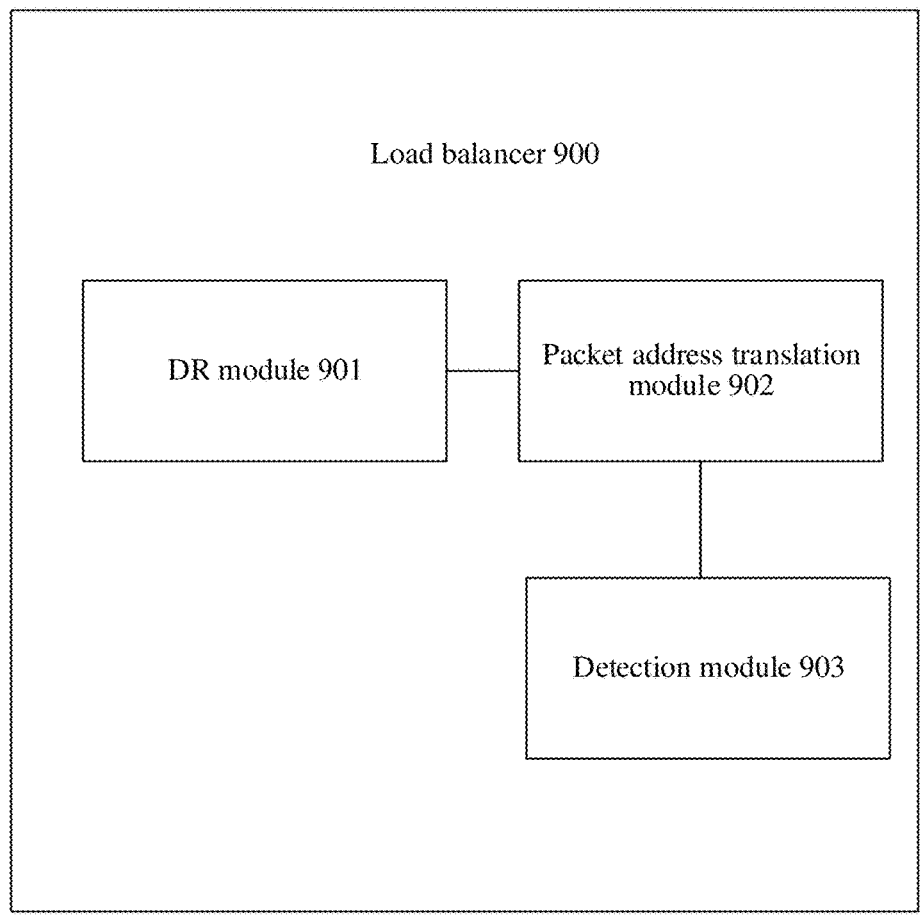
FIG. 9 is a schematic structural diagram of a load balancer for a server cluster according to an embodiment of the present disclosure.

The following describes a load balancer 900 for a server cluster according to an embodiment of the present disclosure with reference to FIG. 9. As shown in FIG. 9, the load balancer 900 includes a DR module 901 configured to receive a client request packet, where the client request packet includes a source IP address and a destination IP address, where the DR module 901 is further configured to determine a destination server according to a preset load balancing policy, the DR module 901 is further configured to send an ARP request packet according to the destination IP address, and the DR module 901 is further configured to obtain an ARP response packet according to the ARP request packet, where the ARP response packet includes an initial MAC address of the destination server, and the initial MAC address is different from an actual MAC address of the destination server, and a packet address translation module 902 configured to update the destination IP address according to the initial MAC address to obtain an updated client request packet, where the updated client request packet includes the source IP address and an updated destination IP address. According to the load balancer in the embodiments of the present disclosure, a data packet may be effectively sent in a large-scale cross-VLAN deployment such that a source IP address of a client may be known on a physical layer, a network layer, and the like.

In a possible implementation manner of the present disclosure, the DR module 901 is further configured to obtain the initial MAC address according to an IP address of the destination server, and obtain the ARP response packet according to the initial MAC address. In a possible implementation manner, the DR module 901 is further configured to obtain the initial MAC address from a preset form according to the IP address of the server, where the preset form is used to store a correspondence between an IP address of a server and a MAC address, and obtain the ARP response packet according to the initial MAC address. In a possible implementation manner, there is a one-to-one correspondence between an IP address and a MAC address.

In a possible implementation manner of the present disclosure, the DR module 901 is further configured to translate the IP address of the destination server according to a preset algorithm to obtain the initial MAC address, and obtain the ARP response packet according to the initial MAC address. In a possible implementation manner, the updated destination IP address is the same as the IP address of the server. In this way, a packet may be correctly sent to a server.

In a possible implementation manner, the load balancer 900 further includes a detection module 903 configured to detect a next-hop MAC address of the load balancer and use the next-hop MAC address as a MAC address of an updated packet. In this way, a packet may be correctly sent to a server.

It should be noted that, to make the description brief, the foregoing method embodiments are expressed as a series of actions. However, persons skilled in the art should appreciate that the present disclosure is not limited to the described action sequence because according to the present disclosure, some steps may be performed in other sequences or performed simultaneously. In addition, persons skilled in the art should also appreciate that all the embodiments described in the specification are exemplary embodiments, and the related actions and modules are not necessarily mandatory to the present disclosure.

Content such as information exchange and an execution process between the modules in the apparatus and the system is based on a same idea as the method embodiments of the present disclosure. Therefore, for detailed content, refer to descriptions in the method embodiments of the present disclosure, and details are not described herein again.

Persons of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

What is claimed is:

1. A packet generation method based on a server cluster and performed by a load balancer, the packet generation method comprising:
   obtaining a client request packet comprising a source Internet Protocol (IP) address and a destination IP address;
   determining a destination server according to a preset load balancing policy;
   sending an Address Resolution Protocol (ARP) request packet according to the destination IP address;
   intercepting and processing the ARP request packet within the load balancer;
   obtaining an ARP response packet according to the ARP request packet by:
      translating an IP address of the destination server according to a preset algorithm to obtain an initial Media Access Control (MAC) address of the destination server from a preset form according to the IP address of the destination server, wherein the preset form stores a correspondence between an IP address of a server and a MAC address; and
      obtaining the ARP response packet according to the initial MAC address of the destination server, wherein the ARP response packet comprises the initial MAC address of the destination server, wherein the initial MAC address of the destination server is different from an actual MAC address of the destination server, and wherein the initial MAC address of the destination server is translated from the actual MAC address of the destination server; and
   updating the destination IP address according to the initial MAC address of the destination server to obtain an updated client request packet, wherein the updated client request packet comprises the source IP address and an updated destination IP address.

2. The packet generation method of claim 1, wherein the load balancer and at least one server in the server cluster are parts of different virtual local area networks (VLANs).

3. The packet generation method of claim 2, wherein the load balancer and each server within the server cluster share a virtual IP (VIP) address.

4. The packet generation method of claim 1, further comprising storing an ARP proxy response flow table, an address translation flow table, and a learning flow table.

5. The packet generation method of claim 4, further comprising calculating the actual MAC address of the destination server using the address translation flow table and the initial MAC address.

6. The packet generation method of claim 1, wherein the load balancer is coupled to a client through the Internet and is coupled to the server cluster through a wide area network (WAN).

7. The packet generation method of claim 1, wherein the load balancer is coupled to a client through the Internet and is coupled to the server cluster through a local area network (LAN).

8. The packet generation method of claim 1, wherein the load balancer operates in a direct routing (DR) mode.

9. The packet generation method of claim 1, wherein the load balancer is disposed at an edge of the server cluster.

10. The packet generation method of claim 1, further comprising selecting a server from the server cluster for the client request packet.

11. A load balance apparatus, comprising:
    a memory configured to store a plurality of instructions; and
    a processor coupled to the memory, wherein the instructions cause the processor to be configured to:
       obtain a client request packet comprising a source Internet Protocol (IP) address and a destination IP address;
       determine a destination server according to a preset load balancing policy;
       send an Address Resolution Protocol (ARP) request packet according to the destination IP address;

intercept and process the ARP request packet within the load balancing apparatus;

obtain an ARP response packet according to the ARP request packet, wherein to obtain the ARP response packet according to the ARP request packet, the instructions further cause the processor to be configured to:

translate an IP address of the destination server according to a preset algorithm to obtain an initial Media Access Control (MAC) address of the destination server from a preset form according to the IP address of the destination server, wherein the preset form stores a correspondence between an IP address of a server and a MAC address; and obtain the ARP response packet according to the initial MAC address of the destination server, wherein the ARP response packet comprises the initial MAC address of the destination server, wherein the initial MAC address is different from an actual MAC address of the destination server is translated from the actual MAC address of the destination server; and update the destination IP address according to the initial MAC address of the destination server to obtain an updated client request packet, wherein the updated client request packet comprises the source IP address and an updated destination IP address.

12. The load balance apparatus of claim 11, wherein the updated destination IP address is a same as the IP address of the destination server.

13. The load balance apparatus of claim 11, wherein the load balancer apparatus is disposed at an edge of a server cluster, and wherein at least one server in the server cluster is part of a different virtual local area network (VLAN).

14. The load balance apparatus of claim 11, wherein the instructions further cause the processor to be configured to store an ARP proxy response flow table, an address translation flow table, and a learning flow table.

15. The load balance apparatus of claim 14, wherein the instructions further cause the processor to be configured to calculate the actual MAC address of the destination server using the address translation flow table and the initial MAC address.

16. A non-transitory computer-readable storage medium comprising instructions which, when executed by a computer, cause the computer to perform a packet generation method, comprising:

obtaining a client request packet comprising a source Internet Protocol (IP) address and a destination IP address;

determining a destination server according to a preset load balancing policy;

sending an Address Resolution Protocol (ARP) request packet according to the destination IP address;

intercepting and processing the ARP request packet within the computer;

obtaining an ARP response packet according to the ARP request packet by:

translating an IP address of the destination server according to a preset algorithm to obtain an initial Media Access Control (MAC) address of the destination server from a preset form according to the IP address of the destination server, wherein the preset form stores a correspondence between an IP address of a server and a MAC address; and obtaining the ARP response packet according to the initial MAC address of the destination server, wherein the ARP response packet comprises the initial MAC address of the destination server, wherein the initial MAC address is different from an actual MAC address of the destination server, and wherein the initial MAC address of the destination server is translated from the actual MAC address of the destination server; and updating the destination IP address according to the initial MAC address of the destination server to obtain an updated client request packet, wherein the updated client request packet comprises the source IP address and an updated destination IP address.

17. The non-transitory computer-readable storage medium of claim 16, wherein the load balancer apparatus is disposed at an edge of a server cluster, and wherein at least one server in the server cluster is part of a different virtual local area network (VLAN).

18. The non-transitory computer-readable storage medium of claim 16, wherein the packet generation method further comprises storing an ARP proxy response flow table, an address translation flow table, and a learning flow table.

19. The non-transitory computer-readable storage medium of claim 18, wherein the packet generation method further comprises calculating the actual MAC address of the destination server using the address translation flow table and the initial MAC address.

* * * * *

UNITED STATES PATENT AND TRADEMARK OFFICE
CERTIFICATE OF CORRECTION

PATENT NO. : 10,911,398 B2
APPLICATION NO. : 16/052923
DATED : February 2, 2021
INVENTOR(S) : Qimeng Wei, Fei Gong and Min Hu Page 1 of 1

It is certified that error appears in the above-identified patent and that said Letters Patent is hereby corrected as shown below:

In the Claims

Claim 11, Column 13, Line 20-21: "destination server is translated" should read "destination server, and wherein the initial MAC address of the destination server is translated is translated"

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*